United States Patent [19]

Hagen

[11] 4,213,625
[45] Jul. 22, 1980

[54] PNEUMATICALLY SUSPENDED BUS

[75] Inventor: Hans Hagen, Munich, Fed. Rep. of Germany

[73] Assignee: Maschinenfabrik Augsburg-Nurnberg Aktiengesellschaft, Munich, Fed. Rep. of Germany

[21] Appl. No.: 939,183

[22] Filed: Sep. 5, 1978

[30] Foreign Application Priority Data

Sep. 2, 1977 [DE] Fed. Rep. of Germany ....... 2739637

[51] Int. Cl.² ............................................. B62D 21/18
[52] U.S. Cl. .................................. 280/43.23; 280/766; 280/711; 280/714; 280/43.24
[58] Field of Search ...................... 296/178; 280/43.14, 280/43.24, 47.15, 47.16, 47.14, 13 R, 43, 766, 43.23; 180/1 A, 29.02, 41, 100, 102, 76, 93, 104

[56] References Cited

U.S. PATENT DOCUMENTS

| | | | |
|---|---|---|---|
| 2,733,823 | 2/1956 | Evans | 280/43.14 |
| 3,179,432 | 4/1965 | Chaneal | 280/DIG. 1 |
| 3,912,293 | 10/1975 | Harbers | 180/24.02 |

FOREIGN PATENT DOCUMENTS 1680020 9/1971 Fed. Rep. of Germany .

*Primary Examiner*—Robert R. Song
*Attorney, Agent, or Firm*—Haseltine, Lake & Waters

[57] ABSTRACT

A bus arranged in accordance with the present invention permits the boarding level to be minimized at bus stops without unduly reducing the ground clearance to be maintained during operation. When supporting struts are being extended at a bus stop, the bus will tilt forward about a horizontal transverse axis extending through these supporting points, so that the distance between the bus body and the roadway will considerably decrease in the forward portion of the bus. Short-circuiting the air suspension bellows of front and rear axles prevents the air bellows from countering the down-movement of the bus body with a restoring force. When passengers have boarded, the bus is restored to its horizontal position by retracting the supporting struts, with the air from the air bellows of the rear axle flowing back to the front axle.

6 Claims, 3 Drawing Figures

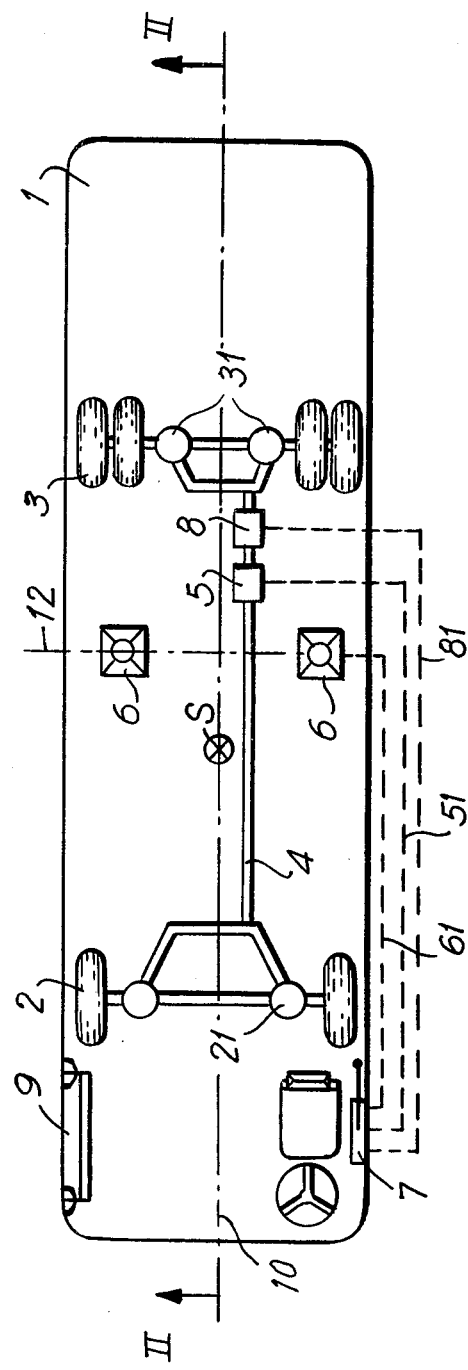
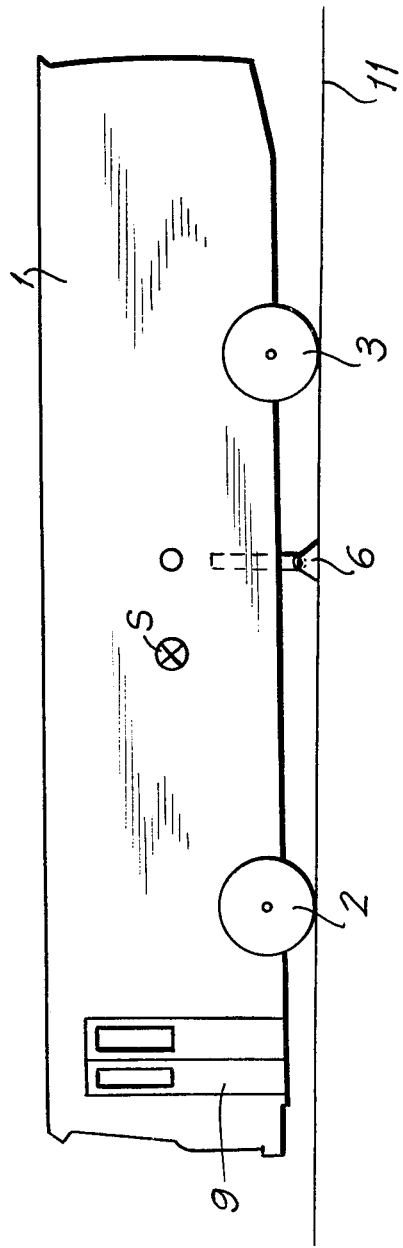

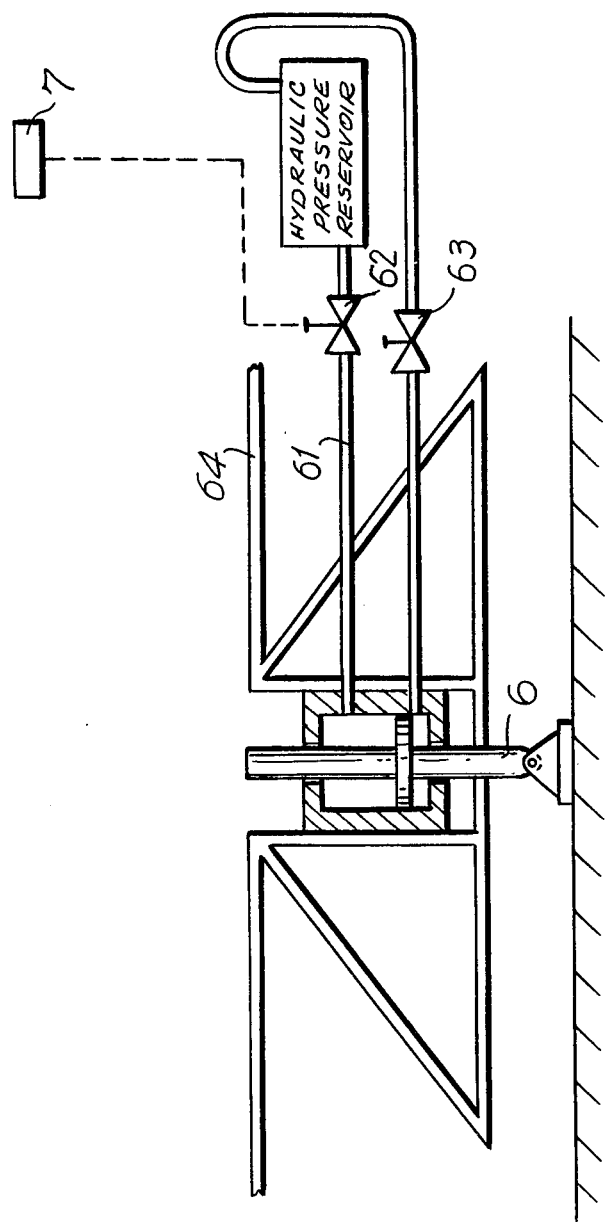

PNEUMATICALLY SUSPENDED BUS

BACKGROUND OF THE INVENTION

The present invention relates to a pneumatically suspended bus for route service.

The chief problem encountered in the design of buses to serve fixed routes is the need to minimize the boarding level above the roadway while maintaining the ground clearance needed for safe running operation and ensuring sufficient angles of slope. Although many attempts have been made to satisfy these two requirements the ideal solution is still wanting.

The prior art discloses a pneumatically suspended vehicle having a level control system where the height of the vehicle above the roadway is adjusted within limits by selective pressurization of the air suspension bellows, which in the case of a bus would enable it to be lowered at the bus stop.

Another solution has also been disclosed where the body of a pneumatically suspended bus is lowered to the road using a level control system. It has been shown, however, that in practice the lowering of the bodies of buses at stops by slective pressurization of an air suspension bellows fails to provide an entirely satisfactory solution, especially because periodic inflation of the air bellows consumes considerable amounts of energy. Also because inflation or deflation of the air bellows takes too long, and as a result, the advantage provided by the low boarding level and the resulting expedited boarding and deboarding rates is again cancelled by the disadvantage of longer stops at the bus stop. This is because of the need to lift the body of the bus again when the passengers have boarded.

SUMMARY OF THE INVENTION

It is the main object to avoid the defects of the prior art.

It is another object of the invention to provide pneumatically suspended bus for route service which achieves a low boarding level above roadway without tolerating the disadvantages of deficient ground clearance or wasteful use of energy and time.

It is still another advantage of the present invention to provide an arrangement where the entrance is in the forward portion of the bus and is provided with extending struts fitted on the body behind its center of gravity to lift the body relative to the roadway, with provision to short-circuit the air bellows of the front and rear axles.

A bus arranged in accordance with the present invention permits the boarding level to be minimized at bus stops without unduly reducing the ground clearance to be maintained during operation. When supporting struts are being extended at a bus stop, the bus will tilt forward about a horizontal transverse axis extending through these supporting points, so that the distance between the bus body and the roadway will considerably decrease in the forward portion of the bus. Short-circuiting the air suspension bellows of front and rear axles prevents the air bellows from countering the down-movement of the bus body with a restoring force. When passengers have boarded, the bus is restored to its horizontal position by retracting the supporting struts, with the air from the air bellows of the rear axle flowing back to the front axle. The connecting line between the front and the rear air bellows is then interrupted to ensure independent pneumatic suspension of the front and rear axles. Distribution of the air in the air bellows requires only a minimal amount of energy (of friction) for displacing the air. There are no compression losses and only small restriction losses. Extension and retraction of the supporting struts may optionally be achieved by hydraulic means. The very small vertical distance to be overcome when lifting, calls for a very small amount of energy and the lifting and lowering rates can be made very fast.

In a preferred aspect of the present invention, common controls are provided for operating the supporting struts and the shut-off valve in the connecting line between the air bellows of the front and rear axles. This simplifies operation in that the driver of a bus arranged in accordance with the present invention, will then have to operate no more than one lever or switch to move the supporting struts and control the shut-off valve.

In a further aspect of the present invention, the connecting line between the air bellows of the front and rear axles incorporates a pump operated by the supporting strut and shut-off valve controls. The pump will expedite the delivery of air through the connecting line, so that tilting of the bus body even when very fast will not be attended by choking losses.

In a further preferred aspect of the present invention, the hydraulic struts are sized such that they can be extended as far as a fixed stop defining the required amount of lifting in the area of the center of gravity. With this arrangement, transverse stabilization of the bus when the front portion of the bus is being lowered is achieved by the supporting struts.

In a further aspect of the present invention that the legs of the supporting struts are articulated to adjust to uneven roadway sections and not to obstruct the tilting process of the bus.

DESCRIPTION OF THE DRAWINGS

An embodiment of the present invention is described in light of the accompanying drawings in which:

FIG. 1 is a plan view of the invention and illustrates a pneumatically arranged bus in schematic arrangement, and FIG. 2 is a longitudinal section taken at II—II of FIG. 1; and FIG. 3 is a longitudinal section through a hydraulically operated strut.

DESCRIPTION OF THE INVENTION

With reference now to FIG. 1 the bus comprises a body 1 essentially shown in outline, a front axle 2 supported against the bus body 1 by air bellows 21, and a rear axle 3 supported against the bus body 1 by air bellows 31. The supply lines to the air bellows 21 and 31 communicate through a connecting line 4 incorporating a shut-off valve 5. The entrance or exit 9 is provided in front of axle 2 in the forward portion of the bus. Arranged behind the center of gravity S of the bus body 1 in symmetry with the longitudinal centerline 10 of the bus body 1, are hydraulically operated supporting struts 6 extending vertically to lift the bus body 1. The struts 6 have an overall stroke of about 30 cm. The hydraulic supporting struts 6 and the shut-off valve 5 are operated by means of a common control lever 7 connected to them through actuating lines 61 and 51. The connecting line 4 additionally incorporates a pump 8 and is again controlled by the control lever 7 through an actuating line 81. The control lever 7 preferably has three operating positions; one extreme position effectuates the extension of the supporting struts 6 to a maximum height, the opening of the shut-off valve 5, and the actuation of the pump 8 to deliver in the direction of the rear axle bellows. In a second operating position of the lever, the supporting struts 6 are retracted and the pump 8 delivers in the direction of the front axle bellows, and in a third position of the lever, finally, the shut-off valve 5 closes. The control lever 7 is preferably arranged near the bus driver's seat. When the lever is operated to lower the front portion of the bus body, the level control valves on both axles 2 and 3 are taken out of action.

As soon as valve 62 is opened (and 63 is opened) strut 6 is pushed downward and the bus frame 64 is lifted. Thereby the load on the forward air bellows is increased and absent connecting line 4, the bellows would not be emptied and could not be compressed enough. However, as the shut-off valve 5 is operated simultaneously with the valve 62, air can escape from the forward air bellows 27 to the rear air bellows 37. Thus, the frame and body of the bus can be lowered at its front portion as shown in FIG. 2. Pump 8 serves to achieve a quicker emptying of the forward air bellows 27 and is optional.

FIG. 2 illustrates the bus at a bus stop in a position where the bus body 1 is tilted forward about a horizontal transverse axis 12 (see FIG. 1) extending approximately through the supporting points 6. The supporting struts 6 rest on the roadway 11. As it will become apparent from the drawings, the distance between the lower edge of the bus body 1 in the entrance area 9 and the roadway 11 has been greatly reduced from that in the normal condition, which would approximately be the distance prevailing at the center of the bus.

The invention is not directed to a drive unit for the bus and therefore, no means are described how to move the bus in a forward direction. The control lever of and the actuating lines 57, 67, 87 can be operated electrically or pneumatically or hydraulically. The struts could be compared with hydraulic jading device.

Many modifications and variations of the present invention are possible in light of the above teachings. It is, therefore, to be understood that within the scope of the appended claims, the invention may be practiced otherwise than as particularly described.

What is claimed is:

1. A pneumatically suspended bus, the body of which is supported on front and rear axles by means of air bellows, wherein: an entrance means is arranged in the front portion of the bus; support strut means for said body are provided on the body behind and next to its center of gravity for lifting said bus body relative to a roadway being transversed by said bus, said air bellows are associated with the respective front and rear axles to support said body and are connected to one another by means of a connecting line for establishing communication therebetween when said support strut means are extended to lift said bus body.

2. A bus as claimed in claim 1, wherein: common control means are provided for operating said support strut means and a shut-off valve disposed in the connecting line.

3. A bus as claimed in claim 2 wherein: pump means is arranged in the connecting line and operated by control means for said supporting strut means and shut-off valve.

4. A bus as claimed in claim 1, wherein: control means being operable to lower the front portion of the bus while simultaneously permitting level control valves at two bus axles to respond and control air flow to said air bellows means.

5. A bus as claimed in claim 1, wherein: said strut means are hydraulically driven and are sized such that they extend as far as a fixed stop, for defining the required amount of lifting in the area of the center of gravity.

6. A bus as claimed in claim 1, wherein: said supporting strut means being formed with articulated legs.

* * * * *